S. GREENE.
Cheese Vat.
No. 65,211.  Patented May 28, 1867.
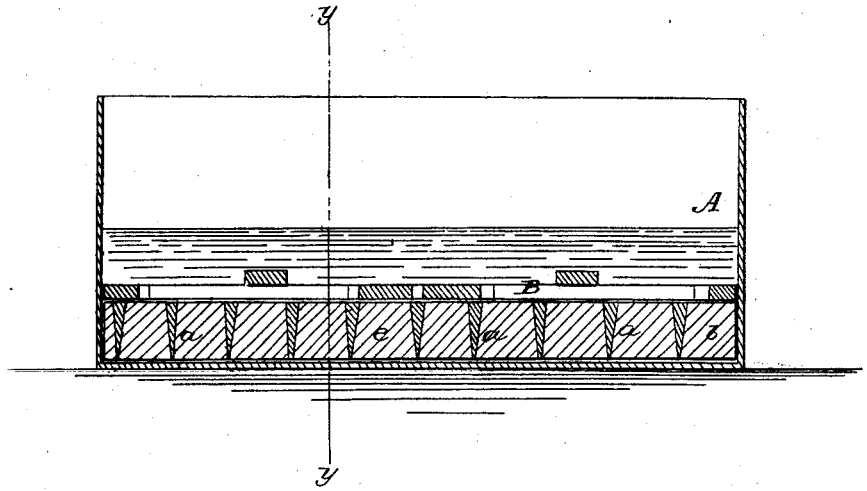
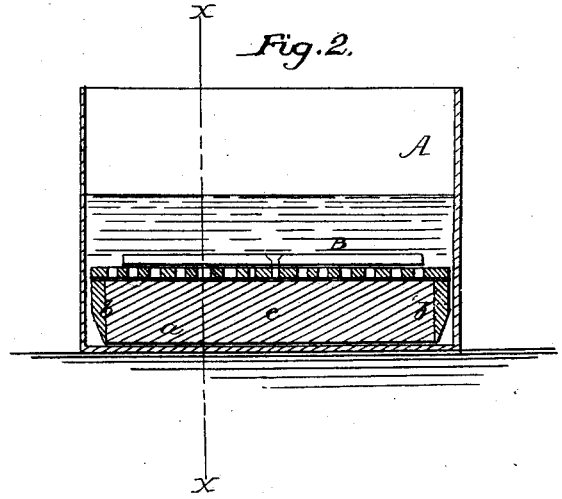
Witnesses:
Theo. Tusche
Wm. Trevom
Inventor:
Sylvester Greene
Per Munn & Co
attorneys

United States Patent Office.

SYLVESTER GREENE, OF ROME, NEW YORK.

Letters Patent No. 65,211, dated May 28, 1867.

SEPARATING CHEESE-CURD FROM WHEY.

The Schedule referred to in these Letters Patent and making part of the same.

TO ALL WHOM IT MAY CONCERN:

Be it known that I, SYLVESTER GREENE, of Rome, in the county of Oneida, and State of New York, have invented a new and useful Improvement in the Manufacture of Cheese; and I do hereby declare that the following is a full, clear, and exact description thereof which will enable others skilled in the art to make and use the same, reference being had to the accompanying drawings, forming part of this specification.

This improvement relates to the means employed for expressing the whey from the curd, whereby the rich or buttery portion of the curd is retained. The usual plan consists in expressing the whey from the curd by direct manual presence, a process which causes a large portion of the butter to be expelled.

My invention consists in placing in the box, in which the curd is produced as usual by the application of rennet, a perforated plate, and a strainer if necessary, the plate and also the strainer, if one be used, resting upon the curd, and by their own gravity alone, or with additional weight, if necessary, made to exert a very gradual pressure on the curd, so that the whey will pass up through the perforated plate. In the accompanying sheet of drawings—

Figure 1 is a longitudinal vertical section of my invention, taken in the line $x\ x$, fig. 2.

Figure 2, a transverse vertical section of the same, taken in the line $y\ y$, fig. 1.

Similar letters of reference indicate like parts.

A represents a rectangular or other shaped box, in which the cream and rennet are placed as usual. After the rennet has been applied a sufficient length of time to admit of the curd being formed, a perforated plate, B, is placed within the box, and of such dimensions as to fit snugly, but so that it may work freely up and down in the box. This perforated plate has pendent blades or cutters $a$ attached to its under side parallel with each other, or the cutters may be framed into side-pieces $b\ b$, and the plate B laid on the cutters, the former being in one or more pieces, as desired. If necessary or preferable a strainer of wire gauze or cloth may be used in connection with the perforated plate B. This plate rests upon the curd, designated by $c$, and by means of its own gravity alone, or with the aid of additional weight, presses gradually down upon the curd, the whey, $d$, under said pressure being forced up through the perforations of the plate B and the strainer, if one be used. The whey may be drawn off by a siphon or other suitable means.

By this improvement the curd is allowed to retain the rich buttery particles, a large portion of which, under the present process, are expressed from it. In my plan the whole mass of curd is subjected to a gradual pressure at the same time, the cutters $a$ dividing the mass so as to insure every particle being efficiently acted upon. In the ordinary manipulation of hand-pressure, small masses being acted upon at a time, the butter is mostly expressed from the curd as well as the whey, and consequently the cheese will be far less rich than that manufactured by my plan.

I claim as new, and desire to secure by Letters Patent—

In the manufacture of cheese, the separating of the whey from the curd by means of a gradual pressure produced by a perforated plate, and either with or without a strainer, substantially as herein shown and described.

SYLVESTER GREENE.

Witnesses:
WM. F. McNAMARA,
ALEX. F. ROBERTS.